5 Sheets—Sheet 1.
A. W. GRAY.
District and Alarm Telegraph.
No. 206,782. Patented Aug. 6, 1878.
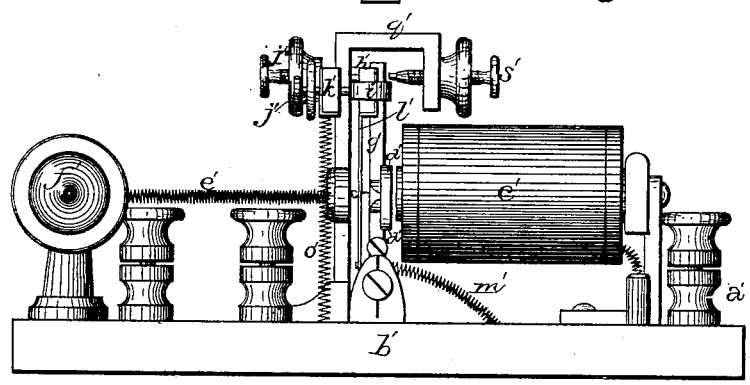
Fig. 1.
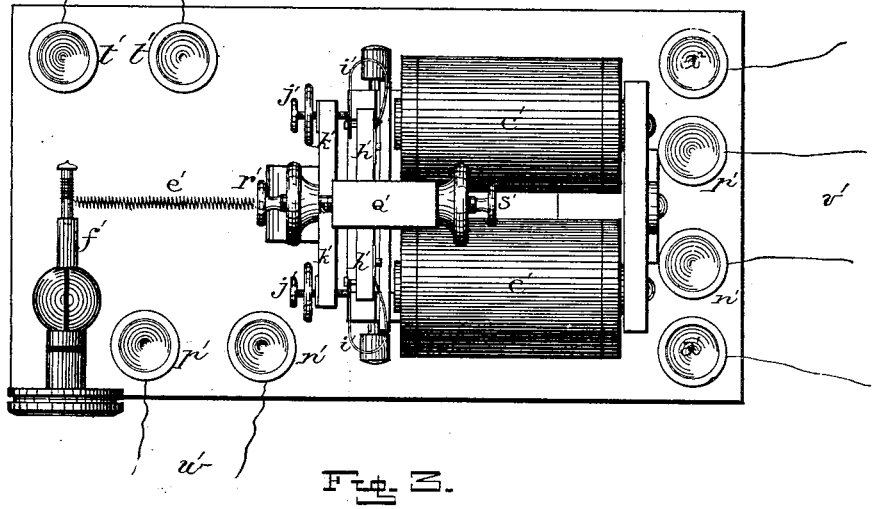
Fig. 2.
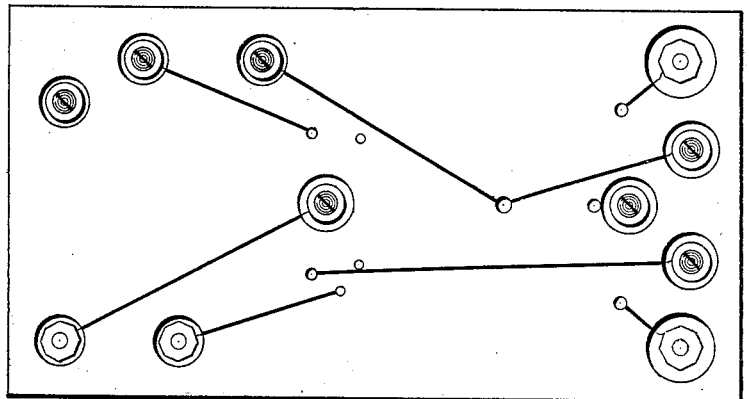
Fig. 3.
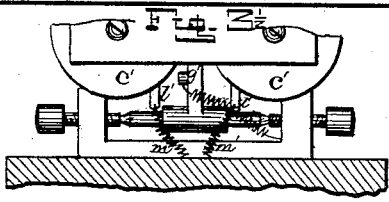
Fig. 3½.
Witnesses:
W. Garner
W. S. D. Haines
Inventor:
A. W. Gray
per
F. A. Lehmann
Atty
N. PETERS, PHOTO-LITHOGRAPHER, WASHINGTON, D. C.

5 Sheets—Sheet 2.
A. W. GRAY.
District and Alarm Telegraph.
No. 206,782. Patented Aug. 6, 1878.
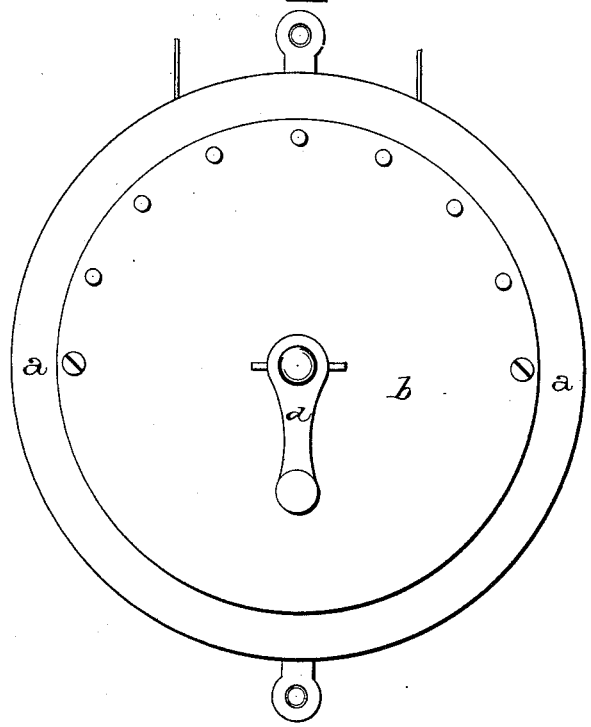
Fig. 7.
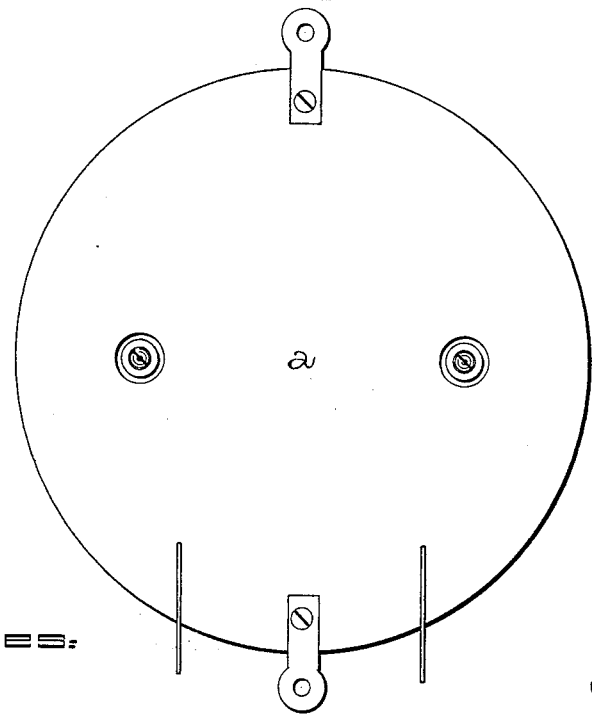
Witnesses:
J. W. Garner
W. S. D. Haines
Inventor:
A. W. Gray,
per
J. A. Lehmann,
Atty.

5 Sheets—Sheet 3.
A. W. GRAY.
District and Alarm Telegraph.
No. 206,782. Patented Aug. 6, 1878.
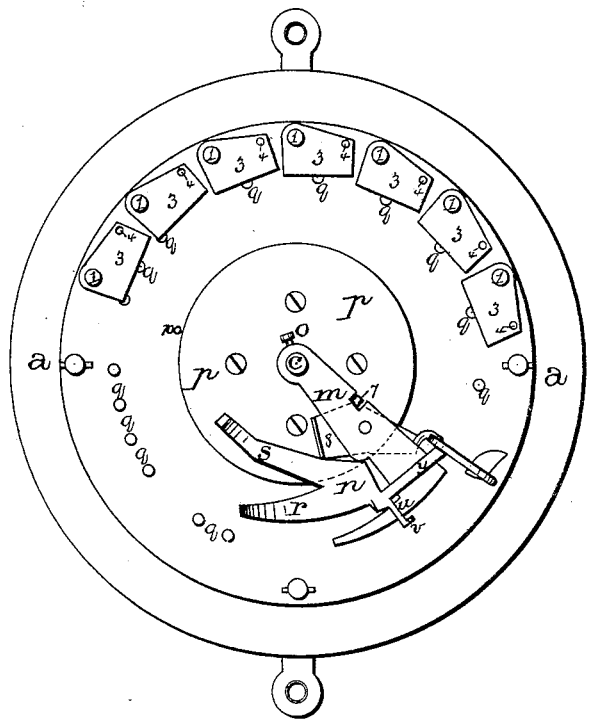
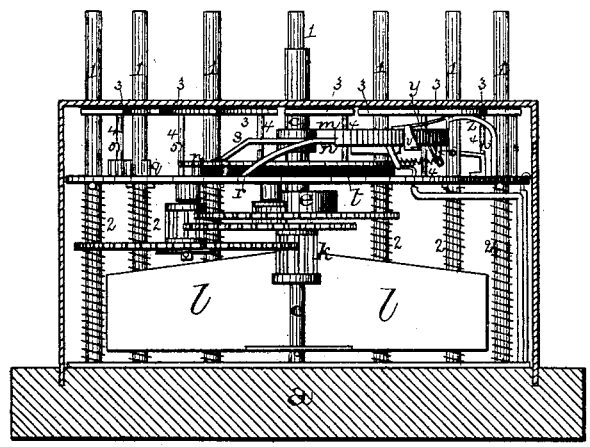
Witnesses.
Inventor
A. W. Gray
per
J. A. Lehmann
Atty.

A. W. GRAY.
District and Alarm Telegraph.
No. 206,782. Patented Aug. 6, 1878.

5 Sheets—Sheet 5.
A. W. GRAY.
District and Alarm Telegraph.
No. 206,782. Patented Aug. 6, 1878.
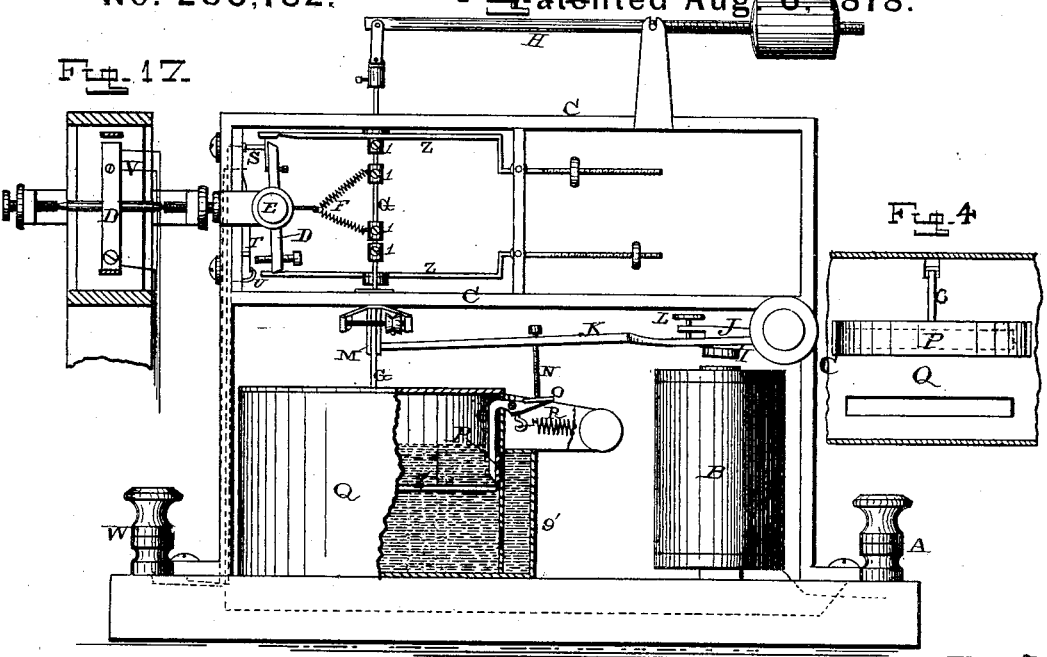
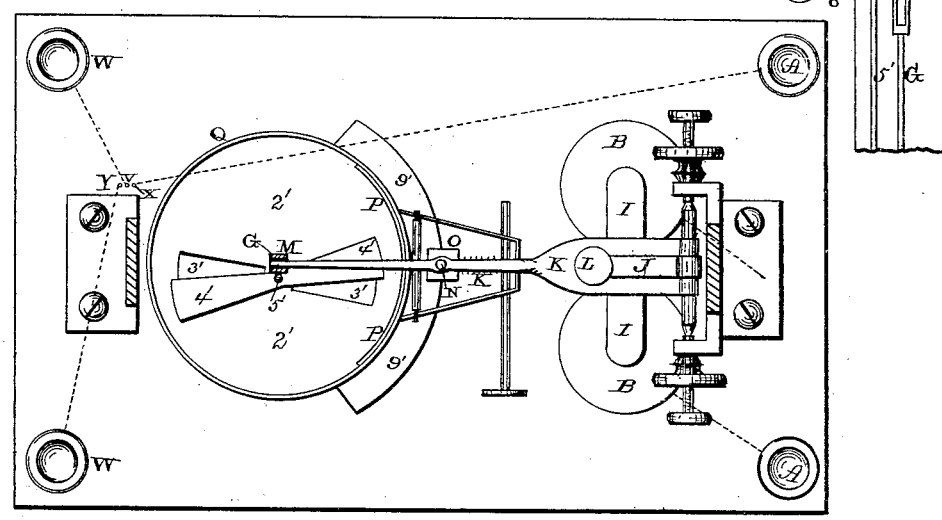
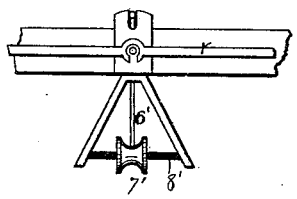
Witnesses:
J. W. Garner
N. S. D. Haines
Inventor:
A. W. Gray,
per
F. A. Lehmann,
Atty.

UNITED STATES PATENT OFFICE.

ADELBERT W. GRAY, OF CARDINGTON, OHIO.

IMPROVEMENT IN DISTRICT AND ALARM TELEGRAPHS.

Specification forming part of Letters Patent No. 206,782, dated August 6, 1878; application filed June 7, 1878.

*To all whom it may concern:*

Be it known that I, ADELBERT W. GRAY, of Cardington, in the county of Morrow and State of Ohio, have invented certain new and useful Improvements in District and Fire-Alarm Telegraphs; and I do hereby declare the following to be a full, clear, and exact description of the invention, such as will enable others skilled in the art to which it pertains to make and use it, reference being had to the accompanying drawings, which form part of this specification.

My invention relates to an improvement in district and fire-alarm telegraphs; and it consists in the combination of a signal-box, a relay, an automatic switch, and a combination register and call-bell, all of peculiar construction, as will be more fully described hereinafter.

Figure 10:
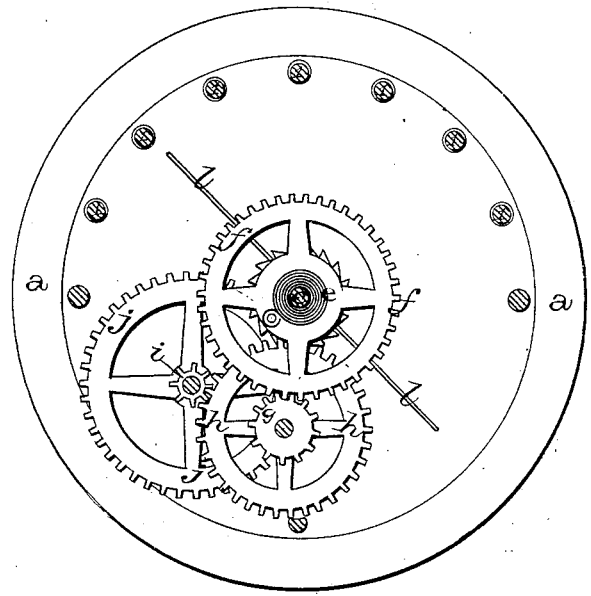
Figure 11:
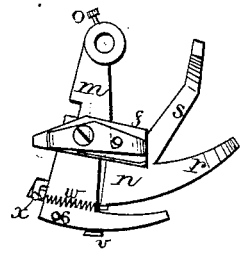
Figure 12:
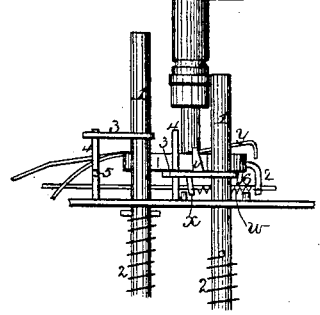
Figure 13:

In the accompanying drawings, Figures 1, 2, 3 are side-plan and inverted views, respectively, of the relay, and Fig. 3½ is a detail view of the same. Figs. 6 and 7 are front and rear views of box. Fig. 8 is a plan view with the top off. Fig. 9 is a side elevation of the same. Figs. 10, 11, 12, and 13 are detail views of the box. Fig. 14 is a side elevation of the switch. Fig. 15 is a plan view of the same. Figs. 4, 5, 16, and 17 show details of the switch.

*a* represents the base of the machine, and *b* the case, upon the outer face of which will be marked the calls for messenger, police, fire, doctor, &c., in the usual manner. The operating mechanism consists of the main shaft *c*, to which the handle *d* is fastened, and which shaft has the spring *e* fastened to it, and the spur-wheel *f* placed loosely upon it like a sleeve between the two supporting-plates. The wheel *f* meshes with the pinion *g* on the same shaft as the spur-wheel *h*, which wheel *h* meshes with the pinion *i* on the same shaft as the spur-wheel *j*. The spur-wheel *j* operates the pinion *k*, which revolves loosely on the main shaft, and has the flutter *l* secured rigidly to it, so as to revolve with it.

By the employment of a flutter the movement of the wheels is regulated so that the spring unwinds and the great noise attendant upon the use of the usual escapement is avoided. All of the shafts upon which the wheels and pinions are secured are made as short as possible, so as to put the wheels in a very compact form, and thus allow as much room as possible for the revolutions of the flutter. By this construction all the advantages of a flutter are secured without making the box any larger than usual.

Secured to the outer end of the main shaft by means of a set-screw, *o*, is the arm or lever *m*, which projects outward to any desired distance. Hinged or pivoted to the front edge of this arm is the two-pronged contact-breaker *n*, which has a vertical movement at its outer ends for breaking contact with the disk *p* and pins *q* as the arm is moving backward while a signal is being given, and a slight horizontal rotary movement around the pivotal point, so as to move the outer prong *r* inward, and thus prevent it from touching the pins *q* as the arm *m* moves forward to give the signal. The inner prong *s*, having its end preferably tipped with platinum, bears upon the disk *p*, so as to close the circuit, the disk *p* being insulated from the upper supporting-plate by a piece of rubber, *t*, and having one of the wires secured to its under side. Projecting outward from the rear outer corner of the contact-breaker *n* is the catch *v*, which has it outer end turned downward some distance below the lower surface of the arm *m*, and which catch catches behind the shoulder *u*, formed on top of the arm, so as to hold the two prongs of the contact-breaker pressed inward. Projecting downward from this outer rear corner is a pin, *x*, to which is fastened a spring, *w*, which spring serves the double purpose of keeping the two prongs *r s* pressed downward, so as to bring them in contact with the disk *p* and pins *q*, and to move the prongs outward when the catch *v* is dislodged from behind the shoulder, so as to cause the outer prong *r* to move out over the pins *q*, the moment the signal has been given. As the giving of the signal dislodges the catch, and as the arm *m* cannot move forward until the prong *r* is moved inward, it is necessary that the catch should be reset automatically after each signal is given, so as to be ready for the next one. For this purpose the arm *y* projects backward from the rear outer corner of the contact-breaker, so that each time the arm *m* is returned to its starting-place by the spring on the main shaft the arm $y$ strikes against the bent rod $z$, and thus moves the contact-breaker far enough forward for the catch to again catch behind the shoulder $u$.

The desired signal is given by pressing inward one of the stops, according to what is wanted. Each one of these stops consists of a longitudinally-moving rod, 1, having a spring, 2, connected to it, between the supporting-plates, and a suitably-shaped plate, 3, rigidly secured to it at a suitable distance from its outer end, outside of the outer supporting-plate. Through one corner of the plate 3 is made a hole, so that it can move back and forth over the small rod 4, which runs parallel with the rod 1. In the outer edge of this rod 4 is made a small notch, 5, in which the plate 3 is made to snap by the spring 2 as the rod 1 is pressed inward for the purpose of giving a signal. By catching in this notch the rod is held pressed in so that one end of the plate 3 projects inward far enough for the outer end of the arm $m$ to pass over its top without touching it, and so that the downwardly-projecting pin 6 on the under side of the arm will catch against it. As this pin pushes against the plate as the arm $m$ is pressed around, the plate 3 acts as a lever to turn the rod 1 far enough around to move its other edge out of the notch 5 in the rod 4, when the spring 2 instantly moves the rod 1 outward far enough for the plate 3 to strike against the under side of the arm $m$, throwing the latch V from behind the shoulder $u$, and holds the plate in contact with the arm until the arm is moved backward from over its top, when the rod at once springs outward its full length. After a rod, 1, has been once pushed inward to give a signal the arm $m$ cannot, in the hurry or excitement of the person sending the signal, be pushed beyond this one signal, so as to give the wrong call, nor will any signal whatever be given unless the arm is pressed far enough around to cause the pin 6 to strike against the plate 3. A person has only to see that he presses in the proper rod or signal, and then he cannot possibly make a mistake, for the arm $m$ cannot be pressed past that one.

By this construction no mistake can ever occur unless the person sending the signal cannot read or is grossly careless.

The first pins, Q, are arranged in groups, so as to indicate the number of the box, as one group of 3, a group of 4, and a third group of 2 will indicate 342, the number of this particular box. After the groups of pins, as shown, there is but a single pin opposite each rod 1, so that, after the groups have been passed, in moving the arm $m$ around the prong $r$ will stop between two of them when the signal is reached. Then, when the arm moves back, the prong will pass over the single pins, which are much farther apart than those in the groups, so as to give one, two, or more dots, as the case may be, with a space between them, and then the groups of 3, 4, and 2. For instance, a carriage is wanted, and the signal for the carriage is the fourth pin beyond the last group of 3. The rod 1, opposite the word "carriage," is pushed in, and then the arm $m$ is turned around until the pin 6 strikes the plate 3 on that rod, when the handle is released. As the arm $m$ moves back the prong $r$ passes over four single pins, making four single dots with considerable spaces between them, and then the groups of pins making groups of dots with a space between each group.

It will be noticed that the pins Q are permanently secured to the upper stationary supporting-plate, to which one of the wires is fastened, and that every time the prong $r$ passes over one of the pins the prong is raised upward, so as to raise the prong $s$ from the disk $p$, and thus break the connection.

By this arrangement of the pins and the double-pronged contact-breaker the use of a breaker-wheel is done away with, and the machine is both simplified and cheapened accordingly.

There is no signal-stop for fire, but the arm is swung entirely around until it strikes the pin 7, against which it rested when at a standstill, and just before it strikes this pin a lever, 8, pivoted to the under side of the arm and pressed upward against it by a spring, 9, strikes the pin so as to press the lever outward under the contact-breaker $n$. The front end of this lever is beveled from its inner corner downward, so as to form an incline, and as this end moves under the breaker it lifts it and holds it suspended, opening the circuit and giving the relay a chance to close the local or fire-department circuit.

The breaker is thus held suspended, as the arm $m$ moves backward, until the pin 10 is reached, which moves the lever inward and lets the two prongs of the breaker drop downward just in time for the outer one to pass over the groups of pins, and thus send the number of the box direct to the fire-stations.

At the same time that the breaker is lifted upward by the lever 8 an incline or any suitable device trips the latch $v$, so that the two prongs will rest upon the disk $p$ and the pins Q, when the pin 10 drops them down.

As the signal is being given, the current enters through the binding-post $a^1$ of the relay $b'$, and, passing through the magnets $c'$ and out through the post $a^2$, attracts the rigid armature $d'$ toward them, so as to cut out all local circuits. This armature $d'$, when not affected by the magnets $c'$, is held pressed away from them by the spring $e'$, the tension of which is regulated by the shaft $f'$.

The rod $g'$, to which the rigid armature is secured, is pivoted at its lower end so as to vibrate freely back and forth at its upper end, to which upper end is secured the bar of non-conducting material $h'$. To each end of this bar $h'$ is fastened the spring contact-breakers $i'$, the free ends of which contact-breakers are regulated by small set-screws, and make connections with the set-screws $j'$, passing through the bar K', made of any conducting material.

The rigid ends of the contact-breakers $i'$ are connected to the conducting-strips $l'$, which have their lower ends fastened to the wires $m'$, which pass down through the base and connect with the binding-posts $n'$.

The screws $j'$ have connected to them the wires $o'$, which pass down through the base and connect with the posts $p'$.

Passing through the metal standard $Q'$, upon which the bar $K'$ is secured from opposite directions, are the screws $r'$ $s'$, between which the upper end of the rod $g'$ vibrates back and forth. To the lower end of this standard is connected a wire, which connects it to the post $t'$, while to the lower end of the rod $g'$ is fastened a wire, which connects it to the second post $t'$.

It will be seen there are three sets of local wires or circuits, two of which are operated at the same time, while the third one is switched out. One of these circuits, $v'$, connects with the register and call-bell in the central office; another one, $u'$, with the switch, and the third one, $w'$, with the fire-alarm department. When no signal is being given the main circuit is closed and the rigid armature is held against the ends of the magnets by the contact-breaker resting on the disk. As soon as a signal is given the circuit is broken by the circuit-breaker passing over the pins in the signal-box, when the rigid armature is drawn away from the magnets by the spring $e'$, when the circuit $u'$, connecting with the switch, and the circuit $V'$, connecting with the register and call-bell, are relayed. The switch, like the relay and the register and call-bell, is placed in the central office.

One of the wires of the circuit $u'$ connects with the post A of the switch, so that the current passes through the magnets B, out through the frame-work C, to the pivoted armature D, through the point S and wire X, out through the second post A and back to relay. This armature D is pivoted upon the adjusting-screws E, and has the two small springs F fastened to its inner side, so as to connect it to the plunger-rod G and cause the armature to rock, so as to alternately connect and disconnect the circuit B.

To the top of the plunger-rod is fastened the weighted lever H, which pulls the plunger-rod upward as soon as the circuit B is disconnected and the armature I is released from the magnets B, to which it has been drawn for the purpose of forcing the plunger-rod downward.

To the armature is fastened the lever J, which is pivoted upon the same bearing as the lever K, and moves up and down through a slot cut in the lever K. By adjusting the thumb-screw L, the lever J may be raised or lowered in the slot, so as to bring the armature nearer to or farther from the magnets. Although the armature may be adjusted independently of the lever K, when one moves both move. The inner end of the lever K passes through a slot, eye, or loop, M, in the plunger-rod, so that, when the magnets draw the armature down and through it, (the lever K,) the lever forces the plunger-rod downward. Passing down through the lever K is a long adjusting-screw, N, which bears down upon the lever O, which lever O has its inner end fastened to the valve P inside of the reservoir Q for holding the glycerine. Fastened to this lever O, outside of the reservoir, is the spring R, which serves to quickly close the valve after it has been opened, and to throw the outer end of the lever upward after it has been depressed by the screw N. As this lever is thrown upward it throws the lever K upward with it, as the circuit is broken, so that the end of the lever K that is in the loop M shall not impede the upward rise of the plunger-rod, which instantly begins to move upward again after having been depressed.

When the plunger-rod descends the springs F cause the upper end of the armature D to move backward out of contact with the point S, and break the circuit of local battery of magnet B, and the lower end to move forward and, by means of a set-screw which passes through it, to force the spring T away from the point U, and thus disconnects the contact between the spring T and the point U, so as to force the whole current to pass through the relay. As soon as the relay begins to operate, by the passage of the contact-breaker over the pins $q$ in the box, then the current $w'$ is opened and closed, so as to operate the call-bell and register in the fire-department. When the switch resumes its first position contact is renewed between the armature D and point S, allowing the whole current to pass through them, thereby cutting the relay out. The points S and U are insulated by means of a piece of rubber, or any other non-conducting material. The spring T is connected to the wire V, and runs through the base and connects with one of the posts W, and the point U is connected to a third wire, Y, which runs down and connects to a second post, W. Pivoted in the frame C are the two latches Z, having counter-weights on one end, so as to nicely adjust them, and which catch over the ends of the pivoted armature D, and hold it long enough in contact with the point S for the current B to draw the armature I down upon the magnets. As soon as the contact B is broken at point S the circuit is broken, so as to release the armature I, when the plunger-rod instantly begins to rise. Upon this rod are placed the four collars $1'$, the two outer ones of which serve to strike against the latches Z, as the rod moves up and down, so as to release the pivoted armature, when the springs F instantly cause the armature to break connection with the point against which it is bearing. The two central collars can be adjusted so as to give the springs any desired tension.

To the lower end of the rod G is secured a plunger, $2'$, which snugly fits the inside of the reservoir Q, which is partially filled with glycerine. This plunger $2'$ has suitable openings $3'$ made through it for the glycerine to flow up and down through, and the size of these openings is regulated by a flat valve, 4', which is fastened to the bottom of the vertical rod 5'. Projecting outward from the upper end of this rod 5' is an arm, 6', the outer end of which arm catches in a groove formed in the edge of the nut 7', which nut moves back and forth on the horizontal screw 8'. As the nut moves the arm with it, the arm causes the rod 5' to turn partially around in its bearings, and as it turns it moves the valve around, so as to open or close the holes 3' to any desired extent. Formed on one side of the reservoir Q is the chamber 9', which connects with the reservoir both at the top and bottom of the chamber, so that when the plunger 2' is forced downward all of the glycerine which cannot pass up through the openings 3' may enter at the bottom of the chamber, rise upward through the chamber, and pass out at the upper opening back into the reservoir again. As the plunger begins to descend the armature I is drawn down upon the magnets, thereby causing the lever K to open the valve P by the screw N, as already described. As the valve opens, the glycerine which is displaced by the downward movement of the plunger 2' rises up through the openings 3'; and, as the valve instantly closes again, none of the glycerine can return by that way, as the plunger begins to rise, and hence must pass entirely through the top openings 3'. Accordingly as the openings are large or small the movement of the plunger will be fast or slow.

Glycerine is used as the regulating medium in preference to all other fluids, as it does not evaporate, always retains about the same density, and will not freeze; but any other fluid may be used, if preferred.

The register and call-bell A' is located in the engine-house, and is connected by the circuit w' with the relay.

The leading object in view in this invention is to transmit the signal, when given for fire, direct to the fire-department automatically, while none but the one signal marked "fire" is allowed to reach the fire-department. All other signals are transmitted only from the signal-box to the district office, and there registered as in usual manner of district telegraphy.

In order to accomplish this end, it becomes necessary that the circuit in which the signal-box is connected should be effected differently when the fire-signal is given than when any of the other signals are given.

This is successfully accomplished as follows: The signal-box may be placed at any desired point within the main circuit. The relay is placed in the district office, and connected in the main circuit so that it may be effected by the signal-box. The automatic switch is also placed in the district office, but is not connected with the main circuit. It is, however, connected with one arm of the relay in such a manner that when the relay is effected by the signal-box the switch is effected by a local circuit being relayed as the armature of the relay vibrates.

When any signal is given at any box in the main circuit the relay is effected accordingly.

The box is so constructed that when any of the signals, excepting that for fire, is given the main circuit is opened but a very short space of time at any one time, being repeatedly opened and closed as the forked contact-breaker in the box passes over the pins designed to lift the same off of the circular disk while it is moving backward to its starting-point after having been turned to any desired signal, these breaks in the main circuit being so rapid or short that the relay does not remain open long enough to relay the local circuit (which passes through and effects the switch) a sufficient length of time to move the plunger down far enough to trip the armature attached thereto, which must be accomplished before the signal can reach the fire-department, as it acts as a switch whereby the fire-circuit is switched in and out of connection with the relay, one of the three armatures of which repeats the signal direct into the fire-department when in this manner effected.

It will be seen that when the signal is turned for fire the arm to which the contact-breaker is attached is swung around until it strikes the pin against which the arm rested before the signal was given. A small lever which is pivoted to the under side of the arm strikes the pin a little in advance of the arm, and is pressed under the contact-breaker, lifting it off of the disk and holding it in this position for a few seconds until the arm has passed backward about half the space which it travels, and at this point the small lever comes in contact with another pin, which moves it back to its former position, when the contact-breaker is allowed to drop against the disk again just in time to pass over the groups of pins which signify the number of the box. The object of holding the contact-breaker off of the disk this length of time is to open the main circuit the proper space of time to effect and press downward the plunger in the switch at the district office, in order that the fire-circuit may be switched in contact with the relay, that the signal may be relayed direct to the fire-department, instead of being repeated by Morse key, as usual.

The third armature of the relay is intended to relay the register and call-bell at the central or district office. Therefore it will be seen that one armature of the relay is connected with the automatic switch, another with the fire-circuit, and the third with the register and call-bell of any desired style in the district office, thus dispensing with two extra relays to accomplish the desired end.

Having thus described my invention, I claim—

1. The combination of the arm $m$ with a contact-breaker movably attached thereto, and the disk $p$ and outer supporting-plate provided with the pins $q$, substantially as specified.

2. In a signal-box, a contact-breaker loosely connected at one corner only to its support, so as to have a vertical and a limited horizontal movement, whereby contact may be broken with the disk $p$ and the breaker moved inward, so as to clear the pins $q$ as the breaker is moved forward, substantially as described.

3. A contact-breaker provided with catch $v$, in combination with arm $m$, to which it is attached, having shoulder $u$ for the catch to catch behind, substantially as set forth.

4. The combination of the arm $m$, a contact-breaker, a catch, $v$, shoulder $u$, spring $w$, and arm $y$, substantially as specified.

5. In a signal-box, the pins $q$, arranged upon one of the plates to which the wires are secured for the purpose of breaking the circuit, substantially as shown.

6. In a fire-alarm-telegraph box, the combination of the arm $m$ and a stop-pin, 6, with one or more stops having an endwise motion, the pin 6 serving both to stop the forward motion of the arm and to trip the stop, substantially as shown.

7. The combination of the arm $m$, contact-breaker having the two prongs $r$ $s$, pins $q$, signals, disk $p$, and outer supporting-plate, substantially as specified.

8. The combination of the rods 1, springs 2, plates 3, and notched rods 4, substantially as shown.

9. The combination of the arm $m$, having pin 6, with the stop provided with the plates 3, and springs 2 and notched rods 4, substantially as described.

10. The arm $m$, provided with a lever, 8, or other devices for raising the contact-breaker upward and holding it in a raised condition, as the arm moves backward, until tripped by the pin 10 or other device, substantially as set forth.

11. The combination of the arm $m$, having the pivoted lever 8, contact-breaker $n$, and pins 7 10, substantially as specified.

12. The stop-rods 1, having an endwise movement, and provided with springs 2 and a catch for holding them pressed inward until tripped, substantially as shown.

13. In a relay, the combination of the magnets $c'$, armature $d'$, bars $h'$ $k'$, contact-breakers or armatures $i'$ $j'$ $r'$ $s$, the three corresponding circuits $u'$ $v'$ $w'$, substantially as shown.

14. In a switch, the reservoir Q, filled with glycerine or other equivalent material, in combination with a plunger that is operated therein by the power of the magnets, substantially as described.

15. The reservoir Q, plunger 2, and valve $4'$, in combination with the rod G, lever K, and magnets B, substantially as set forth.

16. The combination of the reservoir Q, chamber $9'$, and the openings between them, with the valve P, that is made to open as the plunger descends, substantially as specified.

17. The combination of the reservoir Q, chamber $9'$, valve P, lever O, spring R, rod or screw N, lever K, and the magnets B, substantially as shown.

18. The combination of the lever J, having the armature I secured to it, lever K, set-screw L, and the magnets B, substantially as described.

19. The combination of the plunger $2'$, rod G, weighted rod H, springs F, and pivoted armature D, substantially as set forth.

20. The combination of the pivoted armature D, rod G, and springs F with the points S U, spring T, and suitable connecting-wires, substantially as specified.

21. The combination of the rod G, springs F, pivoted armature D, and catches Z, substantially as shown.

22. The combination of the plunger $2'$, valve $4'$, rod $5'$, and regulating screw and nut, substantially as described.

In testimony that I claim the foregoing I have hereunto set my hand this 3d day of June, 1878.

ADELBERT W. GRAY.

Witnesses:
J. W. GARNER,
W. S. D. HAINES.